United States Patent
Pawar

(10) Patent No.: US 12,412,206 B2
(45) Date of Patent: Sep. 9, 2025

(54) IDENTIFYING CANDIDATE REPLACEMENT ITEMS FROM A GRAPH IDENTIFYING RELATIONSHIPS BETWEEN ITEMS MAINTAINED BY AN ONLINE CONCIERGE SYSTEM

(71) Applicant: Maplebear Inc., San Francisco, CA (US)

(72) Inventor: Abhay Pawar, Emeryville, CA (US)

(73) Assignee: Maplebear Inc., San Francisco, CA (US)

( * ) Notice: Subject to any disclaimer, the term of this patent is extended or adjusted under 35 U.S.C. 154(b) by 38 days.

(21) Appl. No.: 18/473,978

(22) Filed: Sep. 25, 2023

(65) Prior Publication Data

US 2024/0020748 A1   Jan. 18, 2024

Related U.S. Application Data

(63) Continuation of application No. 17/069,741, filed on Oct. 13, 2020, now Pat. No. 11,803,891.

(51) Int. Cl.
| | |
|---|---|
| G06Q 30/06 | (2023.01) |
| G06N 20/00 | (2019.01) |
| G06Q 30/0282 | (2023.01) |
| G06Q 30/0601 | (2023.01) |
| G06Q 10/08 | (2024.01) |

(52) U.S. Cl.
CPC ......... *G06Q 30/0631* (2013.01); *G06N 20/00* (2019.01); *G06Q 30/0282* (2013.01); *G06Q 30/0637* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 8,181,177 B1 | 5/2012 | Pliss et al. | |
| 8,316,032 B1 * | 11/2012 | Baluja | G06F 16/5854 707/749 |
| 10,241,772 B1 | 3/2019 | Ning et al. | |

(Continued)

OTHER PUBLICATIONS

Mcauley, J. et al. "Inferring networks of substitutable and complementary products," *International Conference on Knowledge Discovery and Data Mining*, Aug. 10, 2015, pp. 785-794.

(Continued)

*Primary Examiner* — Nicholas D Rosen
(74) *Attorney, Agent, or Firm* — Fenwick & West LLP

(57) ABSTRACT

An online concierge system maintains a graph of items available for purchase. The graph maintains edges between items, where an edge between an item and an additional item indicates that one or more customers have previously replaced the item with the additional item. The edge between the item and the additional item also identifies a number of times customers have replaced the item with the additional item. When a customer orders an item, the online concierge system traverses the graph of items to identify candidate replacement items for the ordered item and identifies one or more of the candidate replacement items to the customer. When identifying the candidate replacement items, the online concierge system accounts for distance between the ordered item and different candidate replacement items in the item graph.

20 Claims, 7 Drawing Sheets

(56) References Cited

U.S. PATENT DOCUMENTS

| | | | |
|---|---|---|---|
| 10,380,484 B2 | 8/2019 | Goel et al. | |
| 10,783,381 B2 | 9/2020 | Yu et al. | |
| 11,367,119 B2 | 6/2022 | Joshi et al. | |
| 11,373,231 B2 | 6/2022 | Soohoo et al. | |
| 11,803,891 B2* | 10/2023 | Pawar | G06Q 30/0637 |
| 12,131,358 B1* | 10/2024 | Rao Karikurve | G06Q 30/0623 |
| 2015/0004579 A1* | 1/2015 | Shelton | G09B 19/003 |
| | | | 434/247 |
| 2016/0307098 A1 | 10/2016 | Goel et al. | |
| 2017/0193592 A1* | 7/2017 | Avidan | G06Q 10/087 |
| 2018/0121966 A1* | 5/2018 | Schmidt | H04L 67/306 |
| 2018/0315059 A1* | 11/2018 | Venkatesh | G06Q 10/087 |
| 2019/0139276 A1* | 5/2019 | Lee | G06T 11/005 |
| 2019/0272433 A1 | 9/2019 | Yu et al. | |
| 2020/0250731 A1 | 8/2020 | Soohoo et al. | |
| 2020/0285878 A1* | 9/2020 | Wang | G06F 18/22 |
| 2021/0233143 A1 | 7/2021 | Cho et al. | |
| 2021/0233145 A1 | 7/2021 | Joshi et al. | |
| 2022/0292567 A1 | 9/2022 | Prasad et al. | |

OTHER PUBLICATIONS

United States Office Action, U.S. Appl. No. 17/069,741, filed Mar. 13, 2023, 17 pages.
United States Office Action, U.S. Appl. No. 17/069,741, filed Apr. 19, 2022, 35 pages.
United States Office Action, U.S. Appl. No. 17/069,741, filed Oct. 6, 2021, 20 pages.

* cited by examiner

IDENTIFYING CANDIDATE REPLACEMENT ITEMS FROM A GRAPH IDENTIFYING RELATIONSHIPS BETWEEN ITEMS MAINTAINED BY AN ONLINE CONCIERGE SYSTEM

CROSS REFERENCE TO RELATED APPLICATIONS

This application is a continuation of co-pending U.S. application Ser. No. 17/069,741, filed Oct. 13, 2020, which is incorporated by reference in its entirety.

BACKGROUND

This disclosure relates generally to ordering an item through an online concierge system, and more specifically to identifying candidate replacement items for an ordered item by the online concierge system.

In current online concierge systems, shoppers (or "pickers") fulfill orders at a physical warehouse, such as a retailer, on behalf of customers as part of an online shopping concierge service. In current online concierge systems, the shoppers may be sent to various warehouses with instructions to fulfill orders for items, and the pickers then find the items included in the customer order in a warehouse. Item inventory at a warehouse may fluctuate throughout a day or week, so a shopper may be unable to find an item ordered by a customer at a warehouse.

To account for varying availability of an item that a customer ordered at a warehouse, an online shopping concierge service may prompt a customer to identify a replacement item for the item when submitting an order. The online shopping concierge system may account for prior selections of replacement items by other customers when prompting the customer to identify a replacement item for an item included in the customer's order. For example, the online shopping concierge system identifies a replacement item that other customers had previously selected for the item include in the customer's order to allow the customer to more easily specify a replacement for the item included in the customer's order.

However, an online shopping concierge system typically receives selections of replacement items for a small fraction of items offered by the online shopping concierge system. While this provides the online shopping concierge system with information identifying replacement items for the fraction of items, the online shopping concierge system lacks information for replacement items for a majority of items offered by the online shopping concierge system. With information from customers about replacement items for a limited number of offered items, conventional online shopping concierge systems are unable to provide customers with suggestions for replacement items for a significant number of items offered through the online shopping concierge systems.

SUMMARY

An online concierge system receives a delivery order from a customer through an interface, such as one presented by an application executing on the customer's client device. The order identifies one or more items the customer seeks to purchase via the online concierge system. Additionally, the order may identify a delivery location where the identified one or more items are to be delivered. The order also identifies a warehouse from which the identified one or more items are to be obtained. One or more of the items included in the order may have limited inventory at the warehouse identified by the order. To account for an item included in the order being unavailable at the warehouse identified by the order, the online concierge system allows the customer to specify a replacement item for an item in the order, authorizing a shopper fulfilling the order to obtain the replacement item if the item is unavailable at the warehouse identified by the order.

To aid the customer in specifying a replacement item, the online concierge system retrieves an item graph stored by the online concierge system. The item graph comprises a plurality of nodes, with each node corresponding to an item available through the online concierge system. Additionally, the item graph includes connections between various pairs of nodes. A connection between a node and an additional node indicates that at least one customer has replaced a product corresponding to the node with an additional product corresponding to the additional node. Hence, a connection between nodes is directional, with the direction indicating that a product corresponding to a node was previously replaced by an additional product corresponding to an additional node connected to the node. For example, a node corresponds to butter, and an additional node corresponds to oil; a connection between the node and the additional node indicates that at least one customer has replaced butter with oil. Additionally, a connection between a node and an additional node includes information identifying a number of times that the additional product corresponding to the additional node has been selected to replace the product corresponding to the node. This allows the online concierge system to maintain information identifying relationships between products and additional products that have historically been selected by users to replace the products.

The online concierge system identifies a specific item included in the received order and identifies the specific item in the item graph. Using connections between nodes corresponding to different items in the item graph, the online concierge system selects a replacement item for the specific item. To select the replacement item, the online concierge system accounts for connections between the specific item and one or more other items in the item graph. For example, the online concierge system traverses the item graph using connections between the specific item and one or more additional items, as well as connections between the additional items and other items to select the replacement item for the specific item. In various embodiments, the online concierge system weights other items based on a number of connections between the specific item and an additional item in the item graph as well as information from connections between the specific item and the additional item indicating a number of times the additional item has previously been selected to replace the specific item. The connections between the specific item and an additional item in the item graph that are evaluated may be direct connections between the specific item and the additional item or indirect connections between the specific item and the additional item (e.g., a connection between the specific item and an intermediate item and a connection between the intermediate item and the additional item).

In various embodiments, the online concierge system accounts for both numbers of times an additional item has been selected as a replacement for an item specified by a connection between the item and the additional item in the item graph and a number of connections between the item and the additional item when selecting a replacement item for the item. For example, the online concierge system generates a replacement score for an additional item replacing the specific item by combining numbers of times the additional item has been selected as replacements from connections between items in the item graph and numbers of connections between the specific item and the additional item. The online concierge system weights a number of times an additional item has been selected to replace and item by a value that is inversely related to a number of connections between the specific item and the additional item, attenuating numbers of times the additional item has been selected when the additional item is indirectly connected to the specific item via the item graph. For example, the online concierge system generates a replacement score for an alternative item replacing the specific item as a sum of a number of times an intermediate item has been selected to replace the specific item weighted by a value corresponding to a single connection between the intermediate item and the specific item and a number of times the alternative item has been selected to replace the intermediate item weighted by a value corresponding to two connections between the alternative item and the specific item. Similarly, the online concierge system generates a replacement score for the intermediate item as the number of times an intermediate item has been selected to replace the specific item weighted by the value corresponding to the single connection between the intermediate item and the specific item. The online concierge system selects an alternative item as a replacement item for the specific item based on the replacement scores for different alternative items. For example, the online concierge system selects an alternative item having a maximum replacement score as the replacement item for the specific item. In another example, the online concierge system ranks the alternative items based on their replacement scores and selects an alternative item having at least a threshold position (e.g., a maximum position) in the ranking as the replacement item for the specific item. In other embodiments, the online concierge system 102 maintains a machine-learned replacement model that is applied to characteristics of the specific item and to characteristics of alternative items to generate a replacement score for an alternative item replacing the specific item. The machine-learned replacement model can be configured to receive as inputs characteristics about the specific item (e.g., brand, type, price, category, availability of the specific item, etc.), characteristics about an alternative item (e.g., brand, type, price, category, availability of the alternative item, etc.), a number of times the alternative item was previously selected to replace the specific item, and a distance between the specific item and the alternative item in the item graph For a pair of a specific item and a replacement item, the machine-learned replacement model outputs a replacement score that is a probability of the alternative item being selected to replace the specific item.

Accounting for connections between items in the item graph when selecting the replacement item for the specific item allows the online concierge system to leverage prior replacements of items with other items by users to identify potentially nonobvious replacement items for the specific item. For example, the item graph allows the online concierge system to determine that users have selected butter as a replacement for ghee and have also selected oil as a replacement for butter, allowing the online concierge system to identify oil as a potential replacement for ghee. Without the item graph, the online concierge system would be unable to identify oil as a potential replacement for ghee when customers had not previously selected oil to replace ghee.

The online concierge system displays the selected replacement item to the customer, allowing the customer to approve the replacement item as a potential replacement for the specific item. For example, the online concierge system displays the replacement item and the specific item to the customer via an interface displayed by an application executing on a client device of the consumer. In response to receiving an authorization from the customer to replace the specific item with the selected replacement item, the online concierge system stores an indication in association with the customer that the customer has authorized replacement of the specific item with the selected replacement item if the specific item is unavailable. This stored indication simplifies fulfillment of the received order by a shopper, allowing the shopper to replace the specific item with the selected replacement item without communicating with the customer if the specific item is unavailable.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
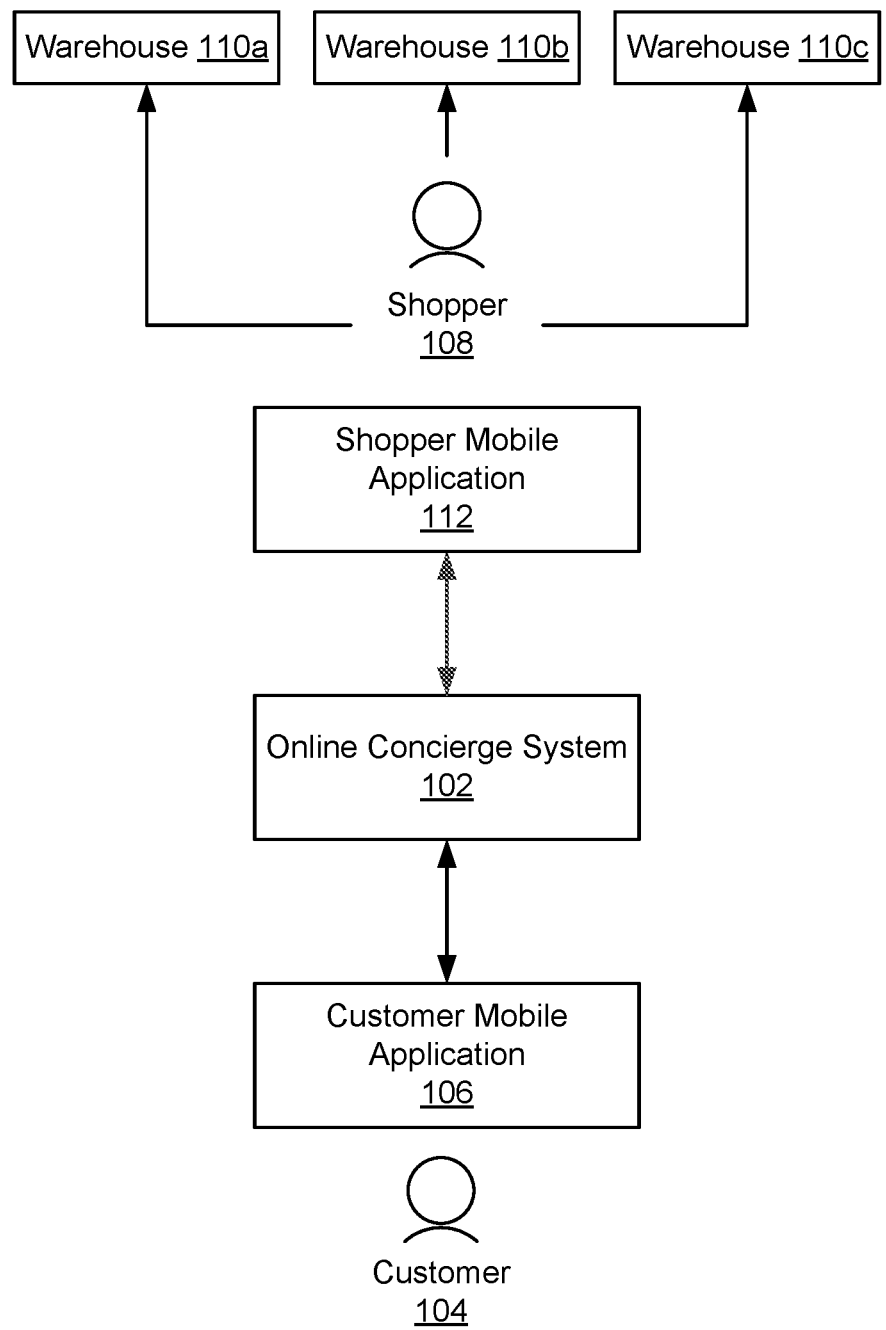
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
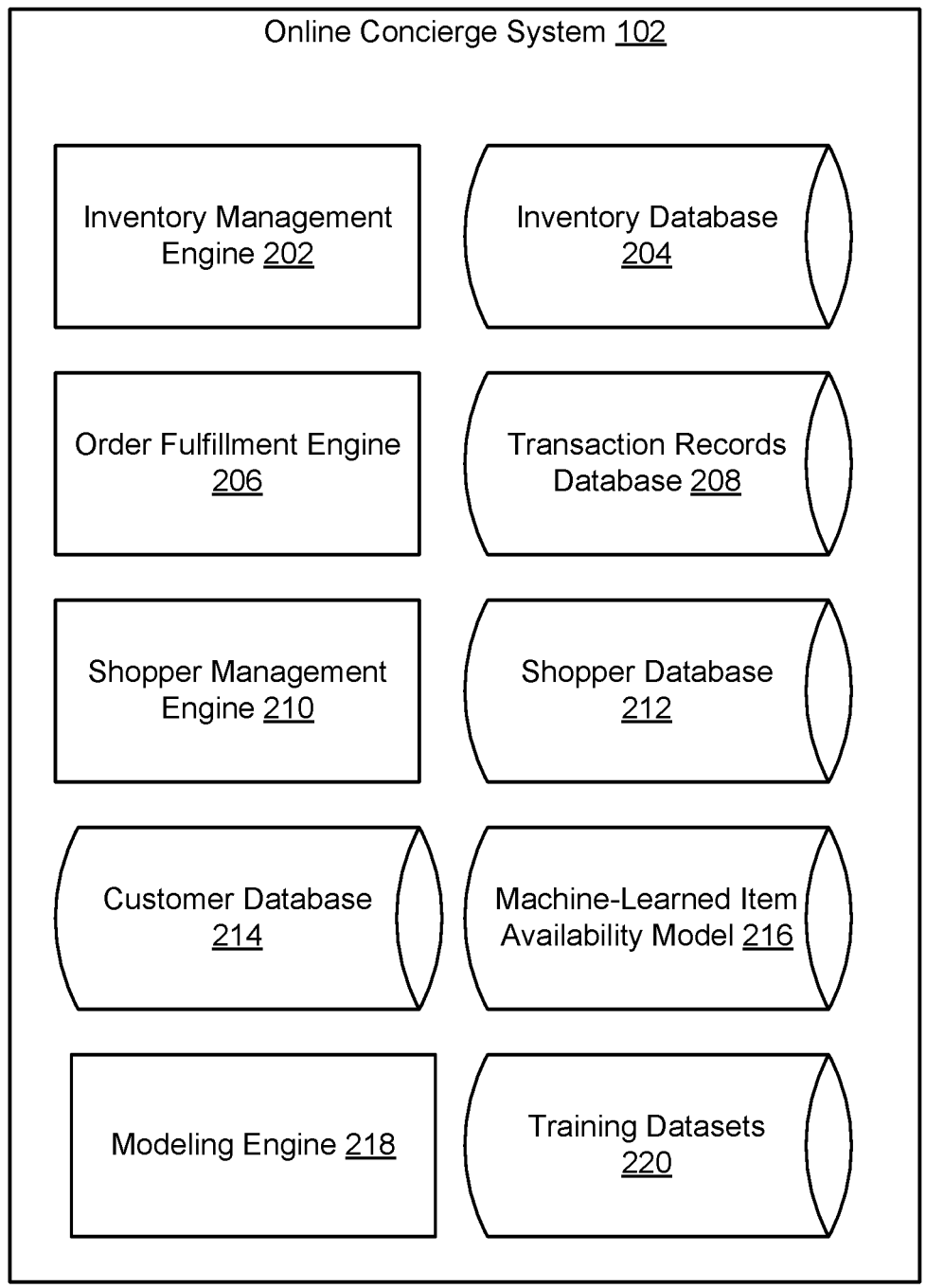
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIGS. 4 and 5.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

In various embodiments, the order fulfillment engine 206 generates and maintains an item graph, further described below in conjunction with FIGS. 6 and 7. The item graph identifies connections between pairs of products, where a product of the pair was previously selected by one or more customers to replace another product of the pair. The connection between a product and an additional product in the item graph is directional and indicates that the additional product was selected to replace the product by one or more customers. As further described below in conjunction with FIG. 6, the order fulfillment engine 206 uses the item graph to suggest a replacement item to a customer for an item included in an order received from the customer, allowing the order fulfillment engine 206 to simplify a customer's specification of a replacement item to substitute for an item in the order if the item is not in stock at the warehouse 110 identified to fulfill the order.

Machine Learning Model

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a customer or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the customer 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108, as described in further detail with reference to FIG. 5. Following updating of the training datasets 220, a modeling engine 218 may retrain a model with the updated training datasets 220, and produce a new machine-learned item availability model 216.

Customer Mobile Application

Figure 3A:
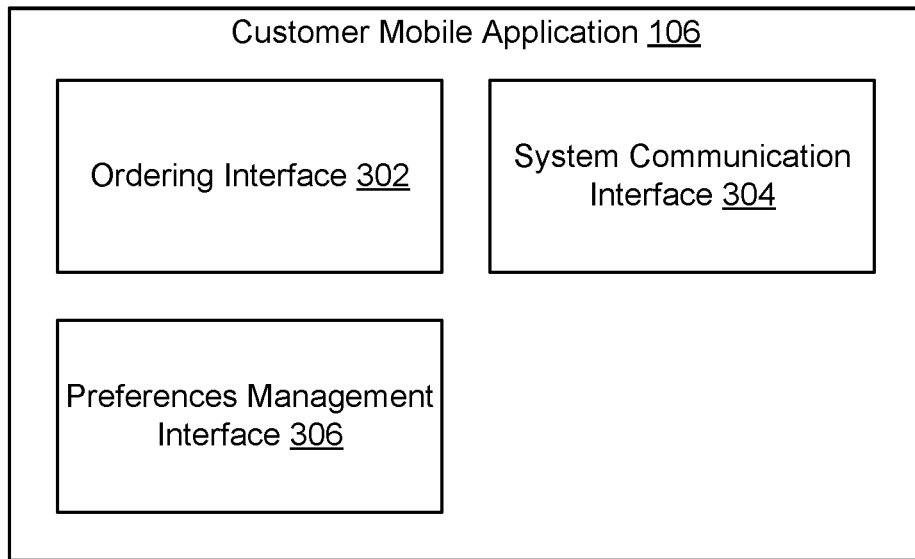
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, and so on.

Shopper Mobile Application

Figure 3B:
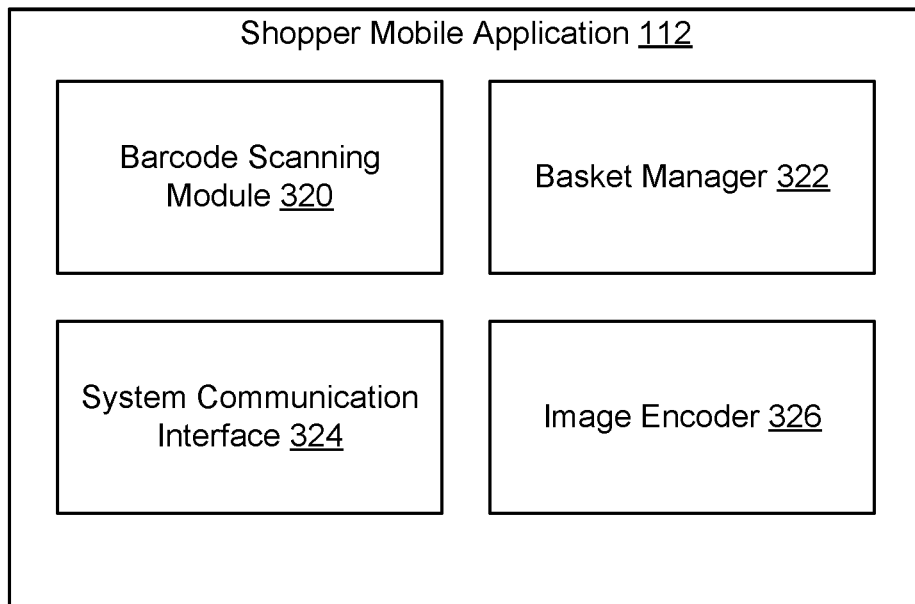
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
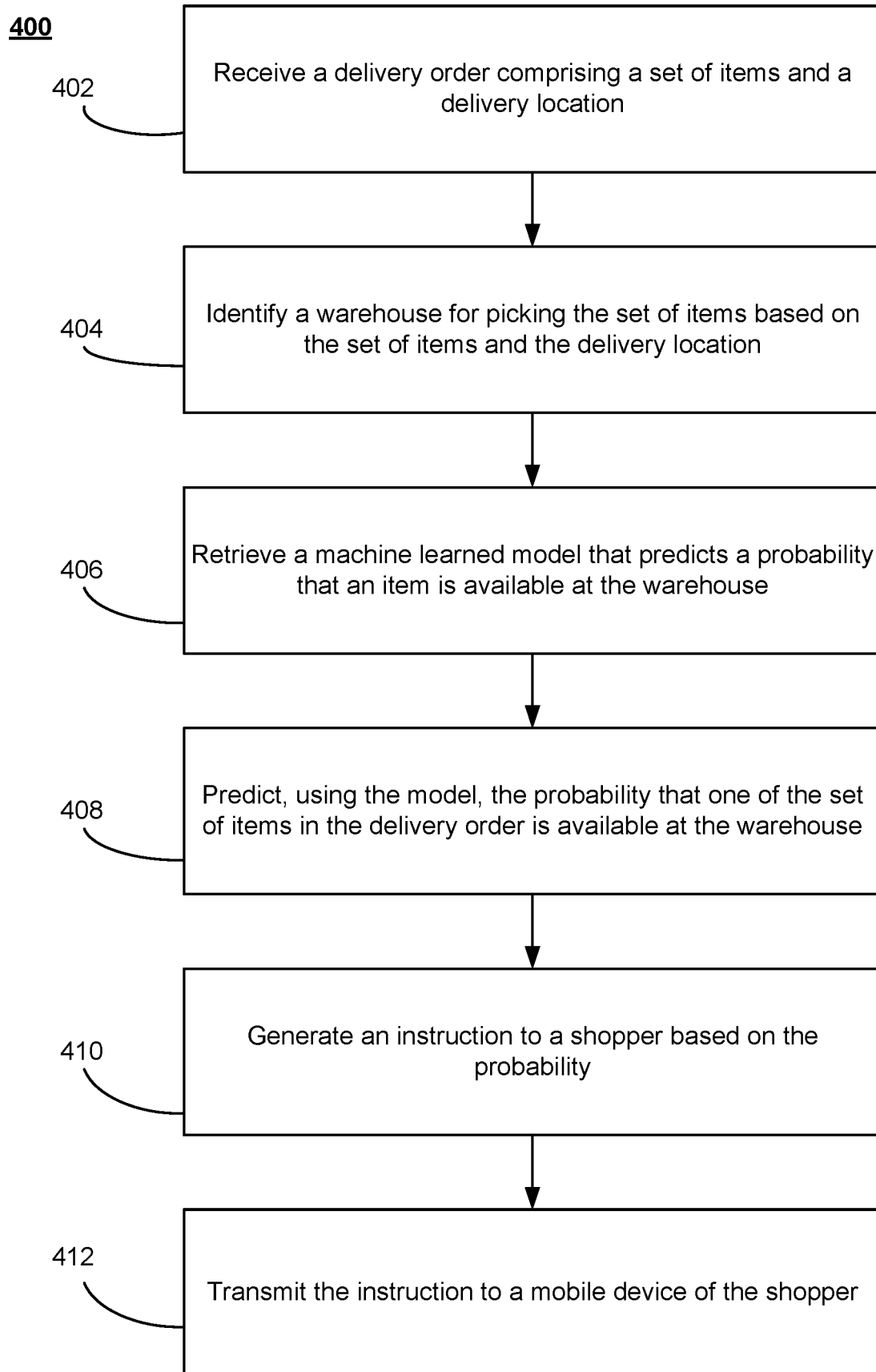
FIG. 4 is a flowchart of a process for predicting inventory availability, according to one embodiment.

As described with reference to FIG. 2, the machine-learned item availability model 216 of the online concierge system 102 can determine an availability of an item requested by the customer 104. FIG. 4 is a flowchart illustrating a process 400 for predicting inventory availability, according to one embodiment. The online concierge system 102 receives 402 a delivery order that includes a set of items and a delivery location. The delivery location may be any location associated with a customer, such as a customer's home or office. The delivery location may be stored with the customer location in the customer database 214. Based on the delivery order, the online concierge system 102 identifies a warehouse 404 for picking the set of items in the delivery order based on the set of items and the delivery location. In some cases, the customer specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a customer based on the probability predicted by the machine-learned item availability model 216.

Updating the Training Datasets

Figure 5:
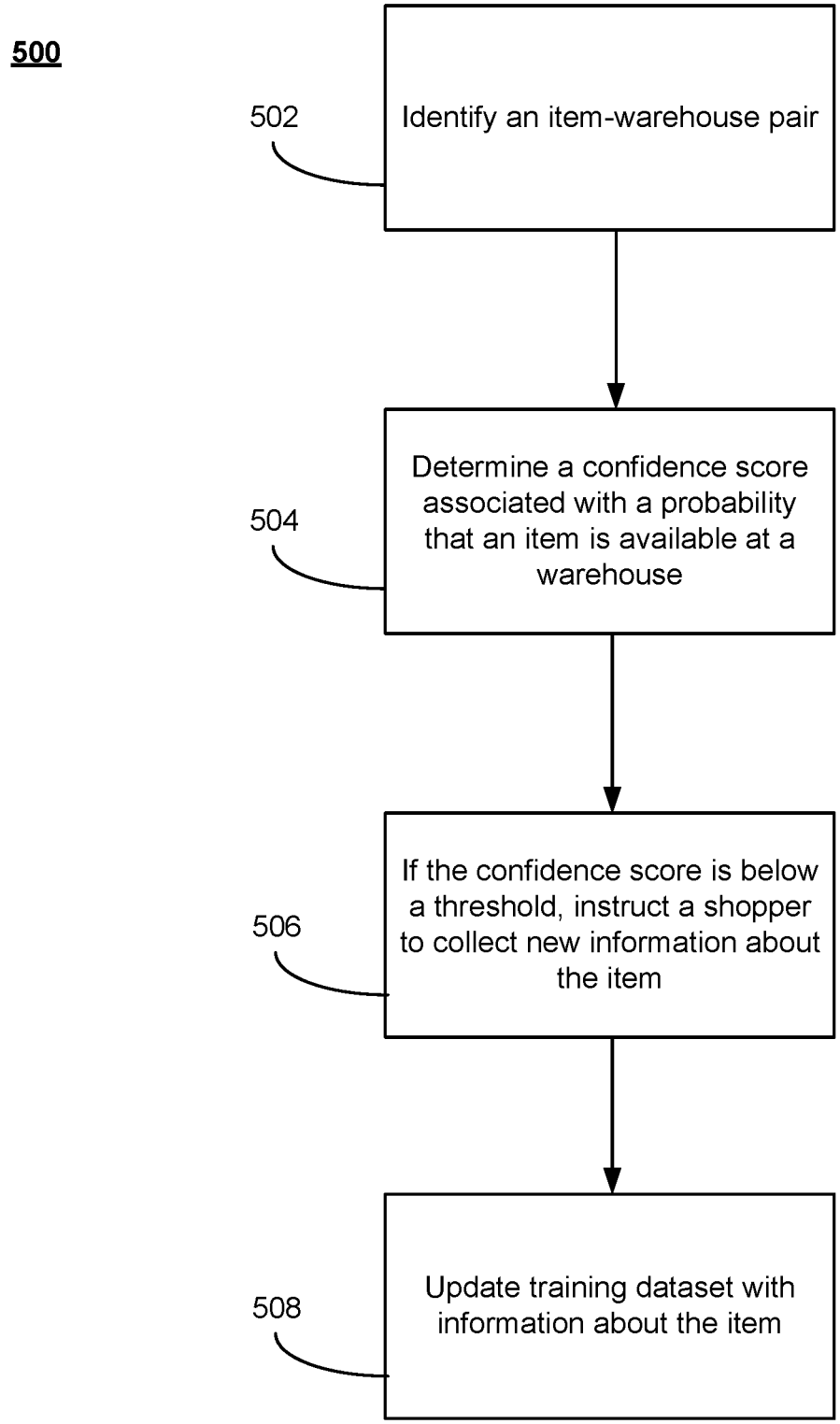
FIG. 5 is a flowchart of a process for updating training datasets for a machine-learned model, according to one embodiment.

FIG. 5 is a flowchart illustrating a process 500 for updating training datasets for a machine-learned model, according to one embodiment. The training datasets may be the training datasets 220 as shown in FIG. 2. While the training datasets 220 include large datasets of information collected from previous delivery orders (e.g., information identifying items and whether the items were available at a warehouse), certain items or warehouses might have less information associated with them in the training datasets 220 than other items or warehouses. For example, if an item is not frequently ordered, or has not been ordered for a long period of time, then it may be more difficult to build an accurate availability prediction in the machine-learned item availability model 216. One way to improve the ability of the machine-learned item availability model 216 to accurately predict item availability is to increase the information about the item in the training datasets 220, and add new information. With larger and/or more recent datasets on the item, the modeling engine 218 can build more statistically meaningful connections between the machine-learning factors described with reference to FIG. 2 and the predicted item availability.

Process 500 thus improves the machine-learned item availability model 216 by increasing the datasets for particular items in the training datasets 220 with low confidence scores. Process 500 may be carried out by the online concierge system 102, e.g., by the inventory management engine 202 in conjunction with the shopper management engine 210, the item availability model 216, and the modeling engine 218. In some examples, process 500 is carried out by the online concierge system 102 following retrieving 406 a machine-learned model that predicts a probability that an item is available at a warehouse, as described in FIG. 4.

The online concierge system 102 (e.g., the inventory management engine 202 using the item availability model 216) identifies 502 an item-warehouse pair. For example, the item and warehouse in the item-warehouse pair may be an item in a received order and warehouse or potential warehouse for picking the items from the received order, e.g., to evaluate the suitability of the warehouse or likelihood of successfully picking the order before the order is picked.

As another example, the item-warehouse pair may be identified from items for which the availability predicted by the machine-learned item availability model 216 was incorrect (e.g., the item was predicted to be available and was determined by the shopper to be out of stock, or the item was predicted to be unavailable and the shopper was able to find it in the warehouse). For items for which the availability prediction was incorrect, the online concierge system 102 may determine if the items have sufficient associated information within the training datasets 220. If the online concierge system 102 determines that the incorrect probability was a result of insufficient or stale information in the training datasets 220, it may identify item-warehouse pairs and carry out process 500 to update the training datasets 220.

Additionally, or alternatively, item-warehouse pairs are identified from new items offered by the online concierge system 102. For new items, there may not be previous delivery order information relating the item availability to item characteristics, delivery order information, or time information in the training datasets 220. The lack of previous delivery orders may lead to a low confidence score for new items. The inventory management engine 202 may initiate the process 500 for new items until sufficient information about the items are collected in the training datasets 220 to improve the item availability confidence score associated with the items.

The online concierge system 102 (e.g., the inventory management engine 202 using the machine-learned item availability model 216) inputs the item, warehouse, and timing characteristics for the identified item-warehouse pair into the machine-learned item availability model 216 and determines 504 a confidence score associated with a probability that an item is available at the warehouse. The online concierge system 102 may determine probabilities and/or confidence scores for all or selected items in an inventory, e.g., items that are expected to be picked based on already-received orders, sales, promotions, holidays, weather, historical trends, or other factors. The confidence score is generated along with the item availability probability (also referred to as "availability") by the machine-learned item availability model 216. The confidence score may be an error associated with the availability probability. The confidence score indicates items that may not have enough training data in the training datasets 220 to generate a statistically significant link between the item's availability and information from the delivery order and/or item characteristics. In some alternate embodiments, the online concierge system 102 may identify, using the item availability model 216, item-warehouse pairs with a low confidence score, e.g., all item-warehouse pairs with a confidence score below a particular threshold. This list of item-warehouse pairs may be filtered, e.g., based on item popularity, predicted items to be ordered, warehouse, or one or more other factors.

In response to the determined confidence level of an item-warehouse pair being below a threshold, the online concierge system 102 (e.g., the shopper management engine 210) instructs 506 the shopper to collect new information about items with a confidence score below a threshold. A confidence score threshold may be an item availability probability between 0 and 1. A threshold confidence score may be 0.3, such that in response to a confidence score below 0.3, the shopper is instructed to collect new information about an item. In some embodiments, the online concierge system 102 also considers the availability probability for the item-warehouse pair. For example, if an item-warehouse pair has a confidence level slightly below the threshold, but a very low or very high availability probability, the online concierge system 102 may determine not to collect new information about the item-warehouse pair. In some embodiments, the threshold used for the confidence score may depend on the availability probability, or vice versa.

In response to the instruction, the shopper 108 determines whether the item is available at the warehouse. The shopper may be instructed to try to find the item at the warehouse, and indicate, through the SMA 112, whether the item is available. This information is transmitted to the online concierge system 102 via the shopper management engine 210, and used to update 508 the training datasets 220. In some embodiments, a shopper may be given a list of items with low confidence scores to seek within the warehouse. The online concierge system 102 updates 508 the training dataset 220 with new information about the item, which includes whether or not the item is available in the warehouse, and any additional item characteristics, warehouse information, or time information as described with respect to FIG. 2. The online concierge system 102 also updates the inventory database 204 based on the received information; e.g., if the inventory database 204 stores the time at which the item was most recently found or not found, this time will be updated based on the input from the shopper 108. In response to the new information collected by the shopper, the modeling engine 218 may update or retrain the machine learning item availability model 216 with the updated training datasets 220. Process 500 may be carried out by the online concierge system 102 until a confidence score associated with a probability that an item is available is above a threshold.

Use Case Examples

An example of process 500 used in conjunction with process 400 is described below. The online concierge system 102 receives 402 a delivery order from a customer 104 through the CMA 106. The customer 104 schedules a delivery at their home of three items to be delivered the following day. As an example, the customer 104 may order grated mozzarella, pizza dough, and tomato sauce, each of which is included in the delivery order. The online concierge system 102 sends the delivery order to the order fulfillment engine 206. The order fulfillment engine 206 uses the inventory management engine 202 and customer database 214 to identify 404 a warehouse for picking the requested items based on the items and the delivery location (i.e., the customer's home). A number of possible warehouses may be identified. For each possible warehouse, the order fulfillment engine 206 identifies 502 an item-warehouse pair with one of the items in the delivery order. Thus, a set of item-warehouse pairs is identified for each of the grated mozzarella, pizza dough and tomato sauce. The online concierge system 102 retrieves 406 the machine-learned item availability model 216 that predicts a probability that an item is available at the warehouse. The online concierge system 102 inputs the item, warehouse, and timing characteristics for each of the identified item-warehouse pairs into the machine-learned item availability model 216. The machine-learned item availability model 216 predicts 408 the probability that each of the grated mozzarella, pizza dough and tomato sauce are available at the identified warehouses. For each of the availability probabilities, the online concierge system 102 also determines 504 a confidence score associated with the probability from the machine-learned item availability model 216.

It is possible that the confidence score for pizza dough confidence score at one or more of the warehouses is below a threshold, given that people frequently make their own pizza dough and it may not be frequently ordered. Thus, pizza dough may have a relatively small and/or old associated dataset in the training dataset 220, leading to a low confidence score on the pizza dough availability probability within the machine-learned item availability model 216. The online concierge system 102, using the shopper management engine 210, instructs 506 a shopper to collect new information about pizza dough at one or more of the warehouses. The shopper management engine 210 may identify an off-duty shopper, or a shopper already at one of the warehouses identified 502 in an item-warehouse pair to collect information about whether or not pizza dough is available at the warehouse. The shopper management engine 210 transmits this instruction through the SMA 112. The shopper 108 may find that pizza dough is in fact available, and transmit the availability to the online concierge system 102 through the SMA 112. This new information is used to update 508 the training dataset 220 and the inventory database 204. The shopper management engine 210 may transmit the same instruction to multiple shoppers 108 at different warehouses, or at different times, such that there is a larger set of data about pizza dough availability added to the training dataset 220, and more recent data in the inventory database 204.

In this example, the modeling engine 218 uses the updated training datasets 220 to retrain the machine-learned item availability model 216. The online concierge system 102 then re-inputs the pizza dough-warehouse pairs into the updated machine-learned item availability model 216 and determines 504 a confidence score associated with the probability that pizza dough is available at a number of possible warehouses. It is possible that the confidence scores are now above a threshold, because the increased data about pizza dough added to the training datasets 220 has improved the machine-learned item availability model 216, and/or the newer data in the inventory database 204 has improved the confidence score. The online concierge system 102 then generates 410 an instruction to a shopper 108 based on the availability probabilities for pizza dough. The instruction may be to pick the pizza dough at the warehouse with the highest availability probability. In other examples, the instruction may be to pick the pizza dough, grated mozzarella and tomato sauce at a warehouse with the highest availability probability for all of these items in the customer's delivery order. The online concierge system 102 transmits the instruction to a mobile device of the shopper 108.

Additionally, or alternatively, the online concierge system 102 may use the machine-learned item availability model 216 to predict an anticipated demand for an item at a warehouse. The online concierge system 102 may compare the number of times an item is included in a set of delivery orders to the item availability predictions generated by the machine-learned item availability model 216, and identify items that are frequently ordered but have low corresponding availability probabilities. For example, around the holidays, there may be an increase in delivery orders including Brussels sprouts, whereas Brussels sprouts may have a low availability prediction since they are not typically stocked in large quantities. The online concierge system may identify the discrepancy between a large volume of item orders and the low availability probability and convey this information to a warehouse 110. Additionally, or alternatively, the online concierge system 102 may transmit information about items that have availability predictions below a threshold.

Identifying Replacement Items for an Item Included in an Order to a Customer

Figure 6:
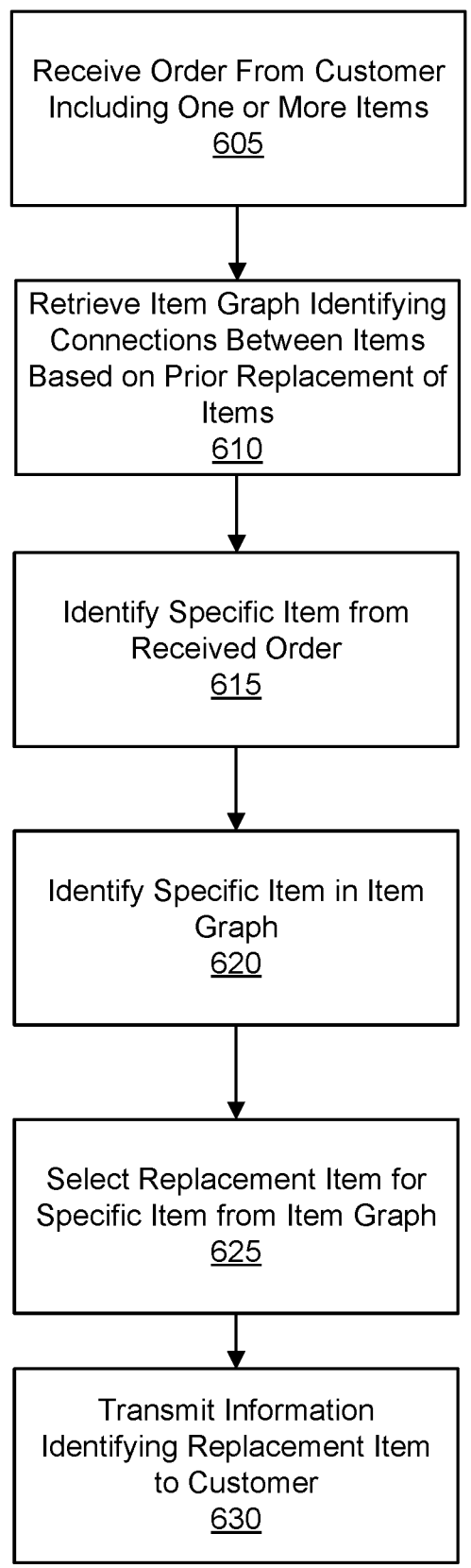
FIG. 6 is a flowchart of a process for a method for identifying a replacement item for an item included in an order to a customer using an item graph maintained by an online concierge system, according to one embodiment.

FIG. 6 is a flowchart of one embodiment of a method for identifying a replacement item for an item included in an order to a customer using an item graph maintained by an online concierge system 102. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments.

The online concierge system 102 receives 605 a delivery order from a customer 104 through the CMA 106. The order identifies one or more items the customer 104 seeks to purchase via the online concierge system 102. In some embodiments, the order also identifies a delivery location where the identified one or more items are to be delivered. The order also identifies a warehouse from which the identified one or more items are to be obtained. One or more of the items included in the order may have limited inventory at the warehouse identified by the order. To account for an item included in the order being unavailable at the warehouse identified by the order, the online concierge system 102 allows the customer 104 to specify a replacement item for an item in the order, authorizing a shopper 108 to obtain the replacement item if the item is unavailable at the warehouse identified by the order.

To aid the customer 104 in specifying a replacement item, the online concierge system 102 retrieves 610 an item graph stored by the online concierge system 102. The item graph comprises a plurality of nodes, with each node corresponding to an item available through the online concierge system 102. Additionally, the item graph includes connections between various pairs of nodes. A connection between a node and an additional node indicates that at least one customer 104 has replaced an item corresponding to the node with an additional item corresponding to the additional node. Hence, a connection between nodes is directional, with the direction indicating that an item corresponding to a node was previously replaced by an additional item corresponding to an additional node connected to the node. For example, a node corresponds to butter, and an additional node corresponds to oil; a connection between the node and the additional node indicates that at least one customer 104 has replaced butter with oil. Additionally, a connection between a node and an additional node includes information identifying a number of times that the additional item corresponding to the additional node has been selected to replace the item corresponding to the node. In other embodiments, the connection between a node and an additional node includes any suitable information describing replacement of an item corresponding to the node with an additional item corresponding to the additional node. For example, the connection between the node and the additional node includes a measure of satisfaction of users with replacement of the item corresponding to the node with the additional item corresponding to the additional node; in various embodiments the measure of satisfaction is based on feedback the online concierge system 102 previously received from users who replaced the item corresponding to the node with the additional item corresponding to the additional node. The measure of user satisfaction may be an average value based on feedback from users (e.g., an average numerical rating provided by users who replaced the item with the additional item) or may be any other suitable value obtained from users who replaced the item corresponding to the node with the additional item corresponding to the additional node (e.g., a number of users from whom positive feedback for replacing the item with the additional item was received, a ratio of a number of users from whom positive feedback for replacing the item with the additional item to a number of users who replaced the item with the additional item). This allows the online concierge system 102 to maintain information identifying relationships between items and additional items that have historically been selected by users to replace the items.

Figure 7:
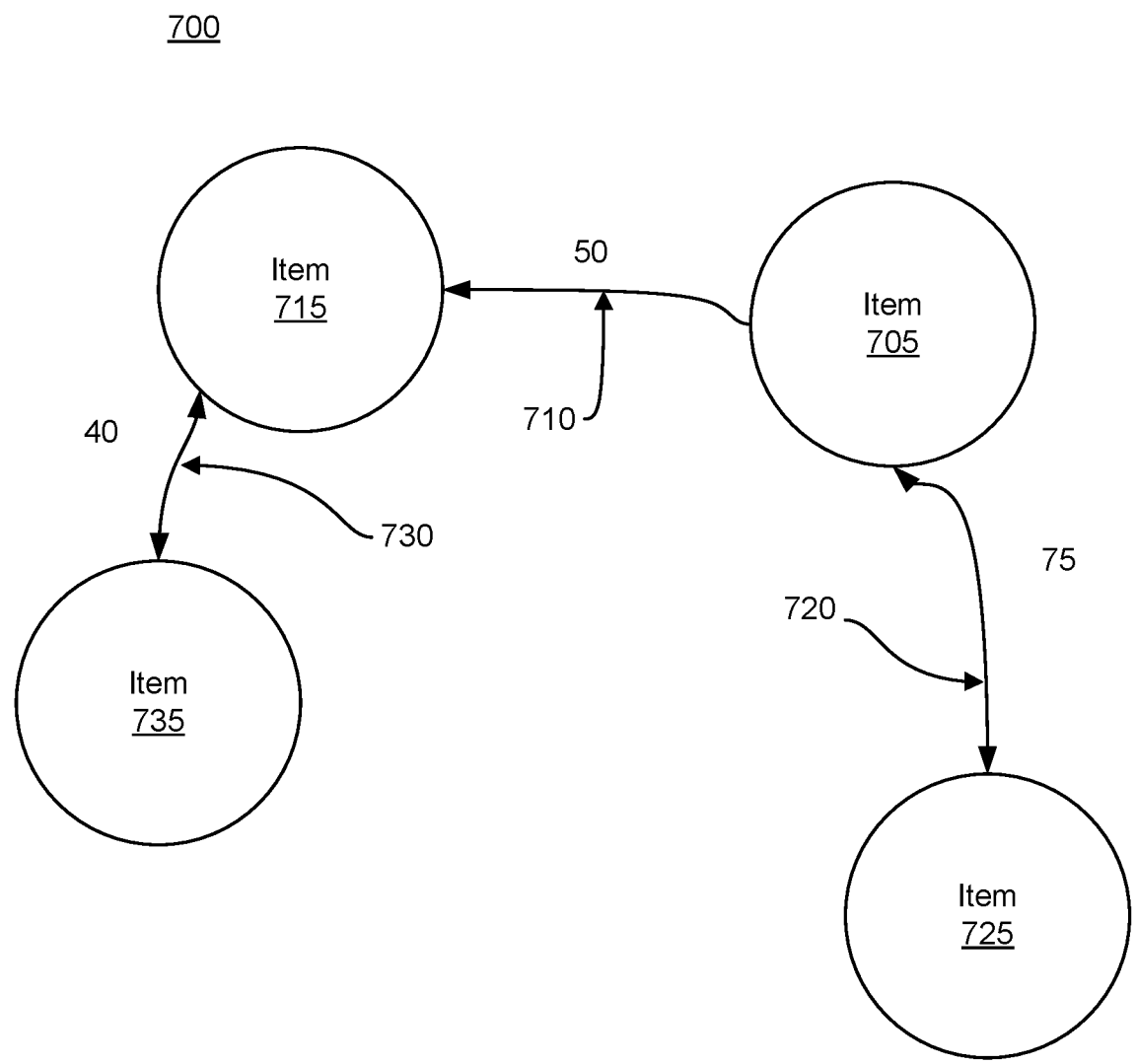
FIG. 7 is an example of an item graph maintained by an online concierge system, according to one embodiment.

FIG. 7 shows an example item graph 700 maintained by the online concierge system 102. In the example of FIG. 7, the item graph 700 includes nodes for item 705, item 715, and item 725. The item graph 700 maintains connections between different pairs of items that indicate when an item of the pair was replaced by the other item of the pair. In the example of FIG. 7, connection 710 indicates that item 705 was replaced by item 715. Similarly, connection 720 indicates that item 705 was replaced by item 725, while connection 730 indicates that item 715 was replaced by item 735. As further described above, each connection 710, 720, 730 includes information identifying a number of times the item replacement represented by the connection previously occurred. In the example of FIG. 7, connection 710 indicates that item 705 was previously replaced by item 715 50 times, while connection 720 indicates that item 705 was previously replaced by item 725 75 times. Similarly, connection 730 indicates that item 715 was previously replaced by item 735 40 times.

Referring back to FIG. 6, the online concierge system 102 identifies 615 a specific item included in the received order and identifies 620 the specific item in the item graph. In some embodiments, the specific item is an item in the received order for which the online concierge system 102 determines that a probability that the item is available at the warehouse from the probability output by the machine-learned item availability model 216 is less than a threshold value. As another example, the specific item is an item selected by the customer 102. In other embodiments, the online system 102 differently identifies 615 each item included in the received order as the specific item 615.

Using connections between nodes corresponding to different items in the item graph, the online concierge system 102 selects 625 a replacement item for the specific item. To select 625 the replacement item, the online concierge system 102 accounts for connections between the specific item and one or more other items in the item graph. For example, the online concierge system 102 traverses the item graph using connections between the specific item and one or more additional items, as well as connections between the additional items and other items to select 625 the replacement item for the specific item. In various embodiments, the online concierge system 102 weights other items based on a number of connections between the specific item and an additional item in the item graph as well as information from connections between the specific item and the additional item indicating a number of times the additional item has previously been selected to replace another item (e.g., the specific item, an intermediate item to which the specific item is connected). The connections between the specific item and an additional item in the item graph that are evaluated may be direct connections between the specific item and the additional item or indirect connections between the specific item and the additional item (e.g., a connection between the specific item and an intermediate item and a connection between the intermediate item and the additional item).

In various embodiments, the online concierge system 102 accounts for both numbers of times an additional item has been selected as a replacement for an item specified by a connection between the item and the additional item in the item graph and a number of connections between the item and the additional item when selecting a replacement item for the item. For example, the online concierge system 102 generates a replacement score for an additional item replacing the specific item by combining numbers of times the additional item has been selected as replacements from connections between items in the item graph and numbers of connections between the specific item and the additional item. The online concierge system 102 weights a number of times an additional item has been selected to replace and item by a value that is inversely related to a number of connections between the specific item and the additional item, attenuating numbers of times the additional item has been selected when the additional item is indirectly connected to the specific item via the item graph. For example, the online concierge system 102 generates a replacement score for an alternative item replacing the specific item as a sum of a number of times an intermediate item has been selected to replace the specific item weighted by a value corresponding to a single connection between the intermediate item and the specific item and a number of times the alternative item has been selected to replace the intermediate item weighted by a value corresponding to two connections between the alternative item and the specific item. Similarly, the online concierge system 102 generates a replacement score for the intermediate item as the number of times an intermediate item has been selected to replace the specific item weighted by the value corresponding to the single connection between the intermediate item and the specific item. The online concierge system 102 selects 625 an alternative item as a replacement item for the specific item based on the replacement scores for different alternative items. For example, the online concierge system 102 selects 625 an alternative item having a maximum replacement score as the replacement item for the specific item. In another example, the online concierge system 102 ranks the alternative items based on their replacement scores and selects 625 an alternative item having at least a threshold position (e.g., a maximum position) in the ranking as the replacement item for the specific item.

In other embodiments, the online concierge system 102 maintains a machine-learned replacement model that is applied to characteristics of the specific item and to characteristics of alternative items to generate a replacement score for an alternative item replacing the specific item. The machine-learned replacement model can be configured to receive as inputs characteristics about the specific item (e.g., brand, type, price, category, availability of the specific item, etc.), characteristics about an alternative item (e.g., brand, type, price, category, availability of the alternative item, etc.), a number of times the alternative item was previously selected to replace the an item (e.g., the specific item, another item connected to the alternative item and to the specific item in the item graph) and a distance between the specific item and the alternative item in the item graph (i.e., a number of connections between the specific item and the alternative item in the item graph). In some embodiments, the machine-learned replacement model receives the number of connections between the specific item and the alternative item as input without receiving the number of times the alternative item was selected to replace another item. However, in other embodiments, the machine-learned replacement model receives any suitable information maintained by the online concierge system 102 about the specific item or the alternative item. Hence, the machine-learned replacement model receives a pair of the specific item (e.g., an item identifier of the specific item) and the alternative item (e.g., an item identifier of the alternative item), and obtains characteristics of the specific item and of the alternative item from stored information by the online concierge system 102. The machine-learned replacement model contains a set of functions generated by the modeling engine 218 from training datasets 220 relating the specific item, the alternative item, the number of times the alternative item has been selected to replace the specific item, and the distance between the specific item and the alternative item in the item graph to the replacement score of the alternative item indicating a probability of a user selecting the alternative item to replace the specific item. Thus, for a pair of a specific item and a replacement item, the machine-learned replacement model outputs a replacement score that is a probability of the alternative item being selected to replace the specific item. The machine-learned replacement model constructs the relationship between the specific item and the alternative item, as well as any other inputs that is generic enough to apply to any number of different pairings of specific item and alternative item. In some embodiments, the replacement score output by the machine-learned replacement model includes a confidence score. The confidence score may be the error or uncertainty score of the output replacement score and may be calculated using any standard statistical error measurement. The set of functions of the machine-learned replacement model may be updated and adapted following retraining with new training datasets 220. The machine-learned replacement model may be any machine learning model, such as a neural network, boosted tree, gradient boosted tree or random forest model. In some examples, the machine-learned replacement model is generated from the XGBoost algorithm. The online concierge system 102 selects 625 a replacement item for the specific item based on the replacement scores determined from application of the machine-learned replacement model to the specific item and to different alternative items, as further described above.

Accounting for connections between items in the item graph when selecting 625 the replacement item for the specific item allows the online concierge system 102 to leverage prior replacements of items with other items by users to identify potentially nonobvious replacement items for the specific item. For example, referring to FIG. 7, the online concierge system 102 may identify item 735 as a potential replacement item for item 705 based on the indirect connection between item 735 and item 705 from connection 710 and connection 730. Without using the item graph 700, the online concierge system 102 would be unable to identify item 735 as a potential replacement for product 705 when customers had not previously selected item 735 to replace item 705.

The online concierge system 102 transmitting 630 information identifying the selected replacement item for display to the customer, allowing the customer to approve the replacement item as a potential replacement for the specific item. For example, the online concierge system 102 transmits 630 information identifying the replacement item and identifying the specific item for display to the customer via the customer mobile application (CMA) 106. In some embodiments, the CMA 106 displays information identifying the specific item (e.g., an image of the specific item, a name of the specific item) in conjunction with information identifying the selected replacement item (e.g., an image of the selected replacement item, a name of the selected replacement item) and a prompt asking the customer to authorize replacement of the specific item with the selected replacement item. The online concierge system 102 may select 625 and transmit 630 information identifying multiple replacement items to the customer in some embodiments, allowing the customer to select a replacement item for the specific item from the displayed replacement items; for example, the online concierge system 102 transmits 630 information identifying replacement products having at least a threshold replacement score or having at least a threshold position in a ranking of products based on replacement scores. In response to receiving an authorization from the customer to replace the specific item with the selected replacement item, the online concierge system 102 stores an indication in association with the customer that the customer has authorized replacement of the specific item with the selected replacement item if the specific item is unavailable. This stored indication simplifies fulfillment of the received order by a shopper, allowing the shopper to replace the specific item with the selected replacement item without communicating with the customer if the specific item is unavailable.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    accessing an item graph stored by an online system, wherein the item graph is a data structure stored in a database of an online system, wherein the item graph comprises a plurality of nodes and a plurality of edges connecting nodes in the plurality of nodes, wherein each of the plurality of nodes corresponds to an item, and wherein each of the plurality of edges indicates that one item has been replaced by another item, and wherein each of the plurality of edges comprises a replacement count that indicates a number of times one item has been replaced by another;
    identifying a first node of the item graph that corresponds to a first item;
    identifying a second node of the item graph that corresponds to a second item;
    computing a number of edges between the first node and the second node;
    computing a replacement score for the first item based on replacement counts of one or more edges between the first node and the second node and a weight that is based on the number of edges between the first node and the second node;
    selecting the first item as a replacement for the second item based on the computed replacement score; and
    transmitting the first item to a client device for display to a user as a proposed replacement for the second item.

2. The method of claim 1, wherein computing the replacement score comprises:
    applying a machine-learning replacement model to data describing the first item, data describing the second item, and the replacement counts of the one or more edges between the first node and the second node, wherein the machine-learning replacement model is trained to generate a replacement score for an alternative item based on replacement counts on edges between nodes in the item graph.

3. The method of claim 2, wherein computing the replacement score comprises:
    applying the machine-learning replacement model to a replacement count for an edge connecting the first node to a third node corresponding to a third item in the item graph, wherein the third node is not connected to the second node in the item graph.

4. The method of claim 1, wherein the number of edges between the first node and the second node is greater than one.

5. The method of claim 1, further comprising:
    computing the weight based on an inverse relationship to the number of edges between the first node and the second node.

6. The method of claim 1, wherein selecting the first item as the replacement item comprises:
    computing replacement scores for a plurality of candidate items, wherein the plurality of candidate items comprises the first item;
    ranking the plurality of candidate items based on the computed replacement scores; and
    selecting the first item based on the ranking.

7. The method of claim 1, further comprising:
    receiving an indication from the client device that the user has approved the first item as a replacement for the second item.

8. The method of claim 7, further comprising:
    updating a replacement count for an edge between the first node and the second node based on the received indication.

9. The method of claim 7, further comprising:
    generating an edge between the first node and the second node based on the received indication.

10. The method of claim 7, further comprising:
    responsive to receiving the indication, transmitting the first item to another client device for display to another user.

11. A non-transitory computer-readable medium storing instructions that, when executed by a processor, cause the processor to perform operations comprising:
    accessing an item graph stored by an online system, wherein the item graph is a data structure stored in a database of an online system, wherein the item graph comprises a plurality of nodes and a plurality of edges connecting nodes in the plurality of nodes, wherein each of the plurality of nodes corresponds to an item, and wherein each of the plurality of edges indicates that one item has been replaced by another item, and wherein each of the plurality of edges comprises a replacement count that indicates a number of times one item has been replaced by another;
    identifying a first node of the item graph that corresponds to a first item;
    identifying a second node of the item graph that corresponds to a second item;
    computing a number of edges between the first node and the second node;
    computing a replacement score for the first item based on replacement counts of one or more edges between the first node and the second node and a weight that is based on the number of edges between the first node and the second node;
    selecting the first item as a replacement for the second item based on the computed replacement score; and
    transmitting the first item to a client device for display to a user as a proposed replacement for the second item.

12. The computer-readable medium of claim 11, wherein computing the replacement score comprises:
    applying a machine-learning replacement model to data describing the first item, data describing the second item, and the replacement counts of the one or more edges between the first node and the second node, wherein the machine-learning replacement model is trained to generate a replacement score for an alternative item based on replacement counts on edges between nodes in the item graph.

13. The computer-readable medium of claim 12, wherein computing the replacement score comprises:
    applying the machine-learning replacement model to a replacement count for an edge connecting the first node to a third node corresponding to a third item in the item graph, wherein the third node is not connected to the second node in the item graph.

14. The computer-readable medium of claim 11, wherein the number of edges between the first node and the second node is greater than one.

15. The computer-readable medium of claim 11, further wherein the operations further comprise:
   computing the weight based on an inverse relationship to the number of edges between the first node and the second node.

16. The computer-readable medium of claim 11, wherein selecting the first item as the replacement item comprises:
   computing replacement scores for a plurality of candidate items, wherein the plurality of candidate items comprises the first item;
   ranking the plurality of candidate items based on the computed replacement scores; and
   selecting the first item based on the ranking.

17. The computer-readable medium of claim 11, further wherein the operations further comprise:
   receiving an indication from the client device that the user has approved the first item as a replacement for the second item.

18. The computer-readable medium of claim 17, wherein the operations further comprise:
   updating a replacement count for an edge between the first node and the second node based on the received indication.

19. The computer-readable medium of claim 17, wherein the operations further comprise:
   generating an edge between the first node and the second node based on the received indication.

20. The computer-readable medium of claim 17, wherein the operations further comprise:
   responsive to receiving the indication, transmitting the first item to another client device for display to another user.

* * * * *